(12) United States Patent
Lee et al.

(10) Patent No.: US 6,328,452 B1
(45) Date of Patent: Dec. 11, 2001

(54) SECURING STRUCTURE FOR HALF MIRROR OF 3-DIMENSION MONITOR

(75) Inventors: Jung-Hyun Lee; Sang-Woo Kim, both of Suwon (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/480,856

(22) Filed: Jan. 11, 2000

(30) Foreign Application Priority Data

May 1, 1999 (KR) .................................................. 99-15766

(51) Int. Cl.[7] .................................................. G02B 7/182
(52) U.S. Cl. .............................................. 359/872; 359/847
(58) Field of Search .................................. 359/847, 848, 359/872; 248/488

(56) References Cited

U.S. PATENT DOCUMENTS

| | | | |
|---|---|---|---|
| 1,152,156 | * 8/1915 | Falk | 359/872 |
| 1,782,175 | * 11/1930 | Pearmain | 359/872 |
| 3,998,530 | * 12/1976 | Kaschak | 359/872 |
| 4,331,402 | * 5/1982 | Nihei | 354/59 |
| 5,959,791 | * 9/1999 | Bagnato, III | 359/872 |
| 6,003,999 | * 12/1999 | Kitaoka et al. | 359/872 |

* cited by examiner

Primary Examiner—Cassandra Spyrou
Assistant Examiner—Euncha Cherry
(74) Attorney, Agent, or Firm—Robert E. Bushnell, Esq.

(57) ABSTRACT

Frames of a half mirror which can control and maintain the angle of the half mirror of a 3D monitor include pair of upper frames installed at both sides of a case in a diagonal direction. The upper frames have protruding portions at the lower tilt surface thereof. The protruding portions are curved inward to form pressing portions exerting force to upper portions of the half mirror resiliently. Upper end portions of the upper frames are fixed to an upper portion of the case in a rotatable manner. A first hole is formed on lower end portions and a first control screw penetrates the first hole and engages a lower portion of the case so that the upper frame can rotate clockwise and counterclockwise for a predetermined angle. A first curved portion is curved in a downward direction perpendicularly to support lower end surfaces of the half mirror. A pair of lower frames onto which the lower portion of the upper frames are installed have protruding portions on the upper tilt surface. The protruding portions of the lower frames are curved inward to form supporting portions supporting lower portions of the half mirror resiliently and the upper ends of the lower frames are secured to the upper portions of the case. A second hole is formed on the lower end portions of the lower frames. A second control screw penetrates the second hole and engaging the lower portion of the case so that the lower frames can rotate clockwise and counterclockwise for a predetermined angle.

6 Claims, 6 Drawing Sheets

SECURING STRUCTURE FOR HALF MIRROR OF 3-DIMENSION MONITOR

CLAIM OF PRIORITY

This application makes reference to, incorporates the same herein, and claims all benefits accruing under 35 U.S.C. §119 from my application SECURING STRUCTURE FOR HALF MIRROR OF 3-DIMENSION MONITOR filed with the Korean Industrial Property Office on May 1, 1999 and there duly assigned Ser. No. 15766/1999.

BACKGROUND OF THE INVENTION

1. Field of the Invention

The present invention relates to a 3D monitor, specifically to securing a frame of a half mirror which can control and maintain the angle of the half mirror of a 3D monitor.

2. Description of the Related Art

Generally, a 3D monitor is a device enabling people to view a 3D image using the difference between the images seen from right and left eyes respectively. Such a 3D monitor can be classified into two types, one using eyeglasses and the other being a lenticular type. The type involving eyeglasses can in turn be classified into types using polaroid glasses, LCD shutter glasses or ones using the principles of anaglyphs. However, wearing glasses to view 3D images is cumbersome for most people.

As for lenticular type, it can be classified into a direct vision type where lenticular lens sheets are placed on the surfaces of display devices such as a CRT or LCD, and projecting type where a projectors are used to project images on the lenticular lens sheet. Generally, half mirrors are installed in the lenticular type to transmit images.

An earlier 3D monitor comprises a first image display device installed on a lower portion of a case, a second image display device installed on the back of the case so as to be perpendicular to the first image display device, a half mirror forming a fort-five degree angle between the first and second image display device and a pair of securing frames supporting the half mirror.

The securing frames are installed on both sides of the case in a diagonal direction. Upper and lower end portions of the securing frames are locked onto the case by means of securing bolts. The securing frames are long and rectangular. A pair of engaging protrusions are formed on the inner sides of the securing frames, forming engaging grooves. Therefore, both ends of the half mirror are respectively inserted in the engaging grooves of the securing frames.

A pair of end caps are placed on the respective ends of the securing frames. Engaging grooves are respectively formed on the inner side of the end caps. Therefore, the half mirror inserted into the engaging grooves of the securing frames are secured by the end caps and at lower and upper ends.

However, when the half mirrors tilts away from the predetermined forty-five degree angle due to vibrations or external forces, it is difficult to correct the deviation. Also, since a gap of a predetermined length is formed between the engaging grooves of the securing frames and the half mirror, images can quiver when vibrations occur.

SUMMARY OF THE INVENTION

An object of the present invention is to provide a securing frame used in a 3D monitor which can prevent the half miffor from quivering due to vibrations by securing the half mirror tightly, while facilitating the correction when deviations occur in the half mirror.

The above and other objects, advantages and features of the present invention will become more readily appreciated and understood from a consideration of the following detailed description of a preferred embodiment of this invention when taken together with the accompanying drawings.

In order to achieve above objects, the present invention provides a securing structure of a half mirror of a 3D monitor comprising: a box shaped case where the half mirror is installed in a diagonal direction; a pair of upper frames installed at both sides of the case in a diagonal direction, having protruding portions at the lower tilt surface thereof, said protruding portions curved inward to form pressing portions exerting force on upper portions of the half mirror resiliently, upper end portions thereof fixed to an upper portion of the case in a rotating manner, lower end portions having a first through hole, a first control screw penetrating the first hole and engaging a lower portion of the case so that it can rotate clockwise and counterclockwise for a predetermined angle; a first curved portion curved toward in a downward direction perpendicularly to support lower end surfaces of the half mirror; a pair of lower frames onto which the lower portion of the upper frames are installed, having protruding portions on the upper tilt surface, the protruding portions curved inward to form supporting portions supporting lower portions of the half mirror resiliently, the upper ends secured to the upper portions of the case, the lower end portions having a second through hole, a second control screw penetrating the second hole and engaging the lower portion of the case so that it can rotate clockwise and counterclockwise for a predetermined angle; the upper ends of the lower frames being curved in a upward direction forming second curved portions supporting the upper end surface of the half mirror, and the half mirror being secured resiliently between the pressing portions and supporting portions.

According to one aspect of the present invention, said first hole has an identical radius of curvature to that of a rotational trajectory of the upper frame, and said second hole has an identical radius of curvature to that of a rotational trajectory of the lower frame, in order to control the angle of of the securing frames, releasing the first and second control screws and then rotating the upper and lower frame in clockwise and counterclockwise directions and then securing the first and second control screws.

BRIEF DESCRIPTION OF THE DRAWINGS

A more complete appreciation of the invention, and may of the attendant advantages, thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

Figures 1, 1A, 1B:
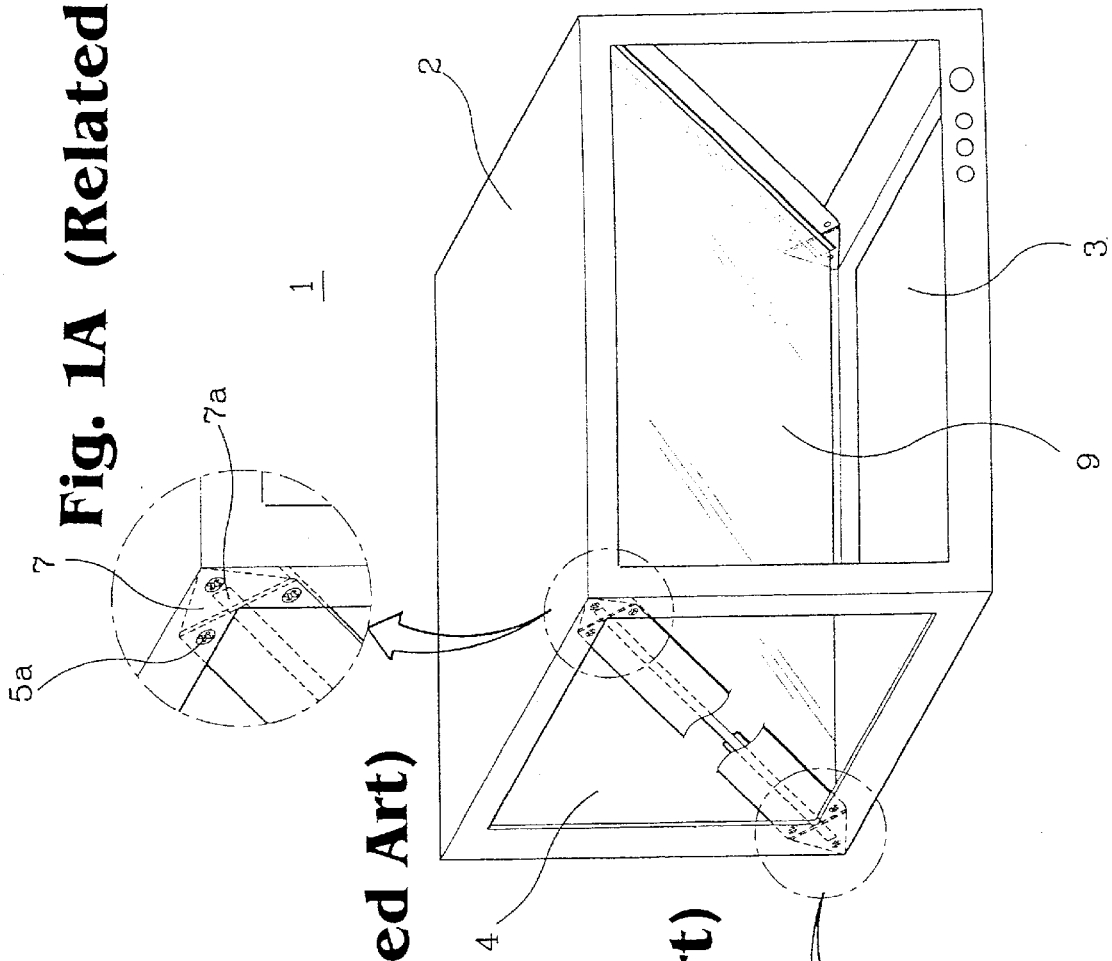
FIGS. 1 through 1B together form a perspective view showing a securing frame supporting a half mirror and a 3D monitor.
Figure 2:
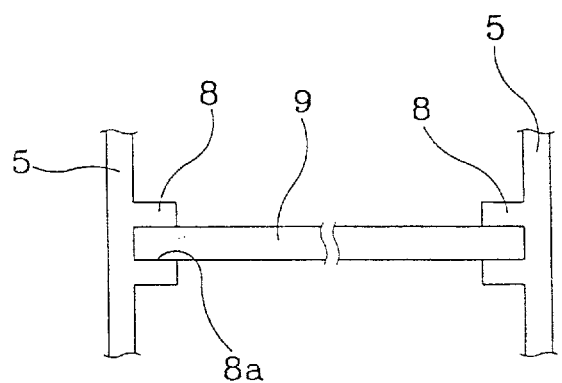
FIG. 2 is a sectional, view showing the half mirror secured onto the securing frame.

FIG. 1 is a perspective view showing a securing frame for securing the half mirror of a 3D monitor. FIG. 2 is a sectional view showing the half mirror installed onto the fixing frame.

As can be seen, the 3D monitor 1 comprises a case 2, a first image display device 3 installed on a lower portion of the case 2, a second image display device 4 installed on the back of the case 2 so as to be perpendicular to the first image display device 3, a half mirror 9 forming a forty-five degree angle between the first and second image display devices 3 and 4, and a pair of securing frames 5 supporting the half mirror 9.

The securing frames 5 are installed on both sides of the case 2 in a diagonal direction. Upper and lower end portions of the securing frames 5 are locked onto the case 2 by means of securing bolts 5a. The securing frames 5 are long and rectangular. A pair of engaging protrusions 8 are formed on the inner sides of the securing frames 5, forming engaging grooves 8a. Therefore, both ends of the half mirror 9 are respectively inserted in the engaging grooves 8a of the securing frames 5.

A pair of end caps 6 and 7 are place on the respective ends of the securing frames 5. Engaging grooves 6a and 7a are respectively formed on the inner side of the end caps 6 and 7. Therefore, the half mirror 9 inserted into the engaging grooves 8a of the securing frames 5 are secured by the end caps 6 and 7 at lower and upper ends.

However, when the half mirrors tilts away from the predetermined forty-five degree angle due to vibrations or external forces, it is difficult to correct the deviation. Also, since a gap of predetermined length is formed between the engaging grooves of the securing frames and the half mirror, images can quiver when vibrations occur.

Figure 3:
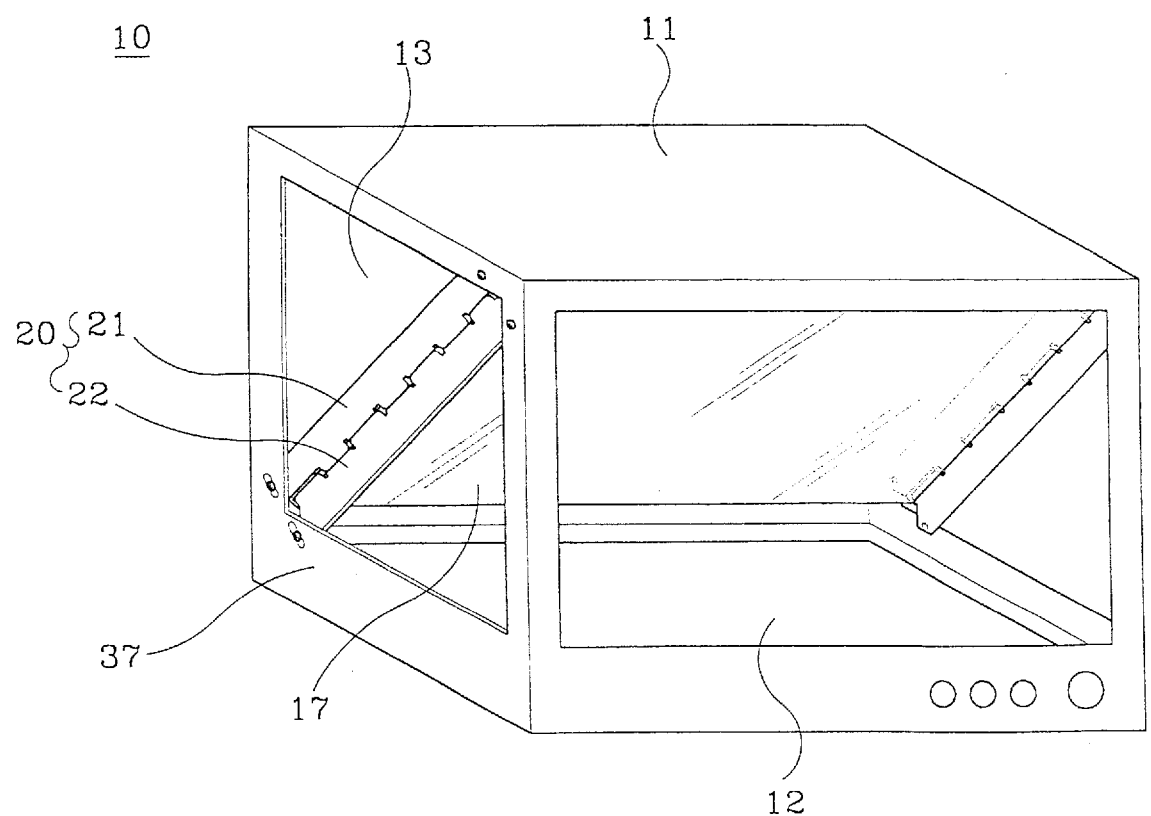
FIG. 3 is a perspective view showing the securing frame supporting the half mirror and the 3D monitor according to the present invention.

FIG. 3 is a perspective showing a securing frame supporting a half mirror and a 3D monitor according to the present invention. FIG. 3 is a side sectional view showing the securing frame according to the present invention.

As can be seen, the 3D monitor 10 comprises a case 11, a first image display device 12 installed at a lower portion of the case 11, a second image display device 13 installed on the back of the case 11 so as to be perpendicular to the first image display device 12, a half mirror 17 whose surface forms a forty-five degree angle between the first and second image display devices 12 and 13, and a pair of securing frames 20 supporting the half mirror 17. Since the construction of the two securing frames are of identical construction, only one securing frame 20 will be explained hereinafter.

The securing frame 20 is rectangular shaped bar of a predetermined length, comprising an upper frame 21 and a lower frame 22.

A first through hole 18 is formed on the upper end portion 21a of the upper frame 21. A first engaging screw 19 penetrates the first through hole 18 and engages the case 11. A first hole 23 is formed on the lower end portion 21b of the upper frame 21. In one embodiment, the first hole 23 has a radius of curvature identical to the circular trajectory of the upper frame 21 during its rotation. A first control screw 24 penetrates the first hole 23 and engages a first engaging groove(not shown) formed on the case 11.

Therefore, the angle of the upper frame 21 can be minutely changed by releasing the first control screw 24 held within the first hole 23, then moving the upper frame 21 in vertical direction for predetermined distance, and then securing the first control screw 24.

The lower frame 22 is secured to the case 11 in a manner identical to the upper frame 21. That is, a second through hole 35 is formed on the upper end portion 22a of the lower frame 22. A second engaging screw 36 penetrates the second through hole 35 and engages the case 11. A second hole 31 is formed on the lower end portion 22b of the lower frame 22. The second hole 31, in the first embodiment, has a radius of curvature identical to the circular trajectory of the lower frame 22 during its rotation. A second control screw 32 penetrates the second hole 31 and engages a second engaging groove(not shown) formed on the case 11.

Therefore, the angle of the lower frame 22 can be minutely changed by releasing the second control screw 32 held within the second hole 31, then moving the lower frame 22 in a horizontal direction for a predetermined distance, and then engaging the second control screw 32.

Figure 5:
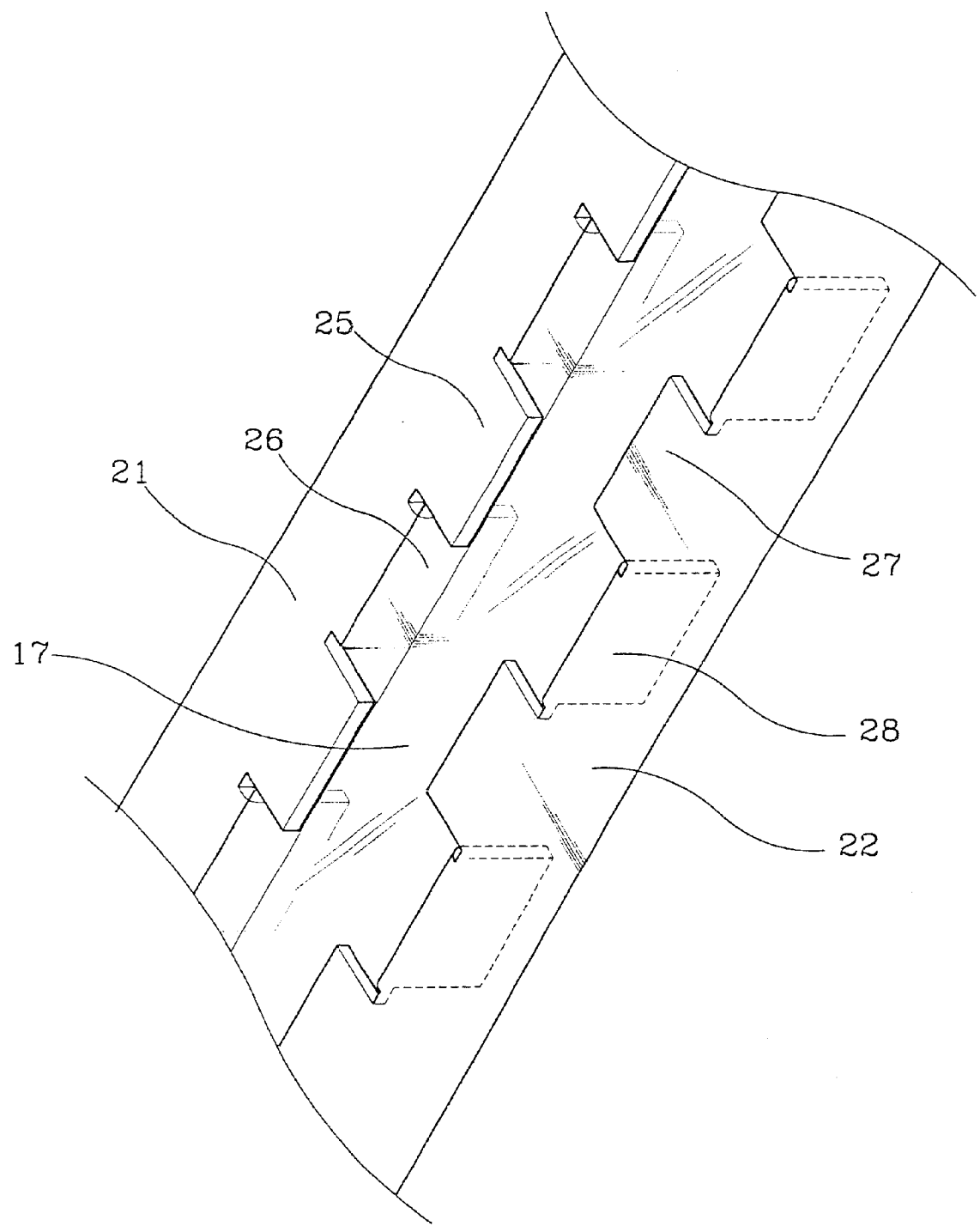
FIG. 5 is an enlarged perspective view showing the securing of the half mirror onto the securing frame according to the present invention.

A lower tilt surface 25 of the upper frame 21 has protrusions. That is, as can be seen in FIG. 5, predetermined portions of the lower tilt surface 25 of the upper frame 21 are cut and curved inwards toward the inner side of the upper frame 21, forming resilient pressing portions 26. The pressing portions 26 are formed in subsequent manner along the lower tilt surface 25 of the upper frame 21. Therefore, the upper surface of the half mirror 17 is resiliently pressed in a lower direction.

The upper tilt surface 27 of the lower frame 22 also has protruding portions which alternate with the protruding portions of the upper frame 21. That is, predetermined portions of the upper tilt surface 27 of the lower frame 22 are cut and curved inwards toward the lower frame 22, forming resilient supporting portions 28.

Furthermore, the half mirror 17 is disposed between the pressing portions 26 and the resilient supporting portions 28. This prevents the half mirror 17 from vibrating due to external forces.

Figure 6:
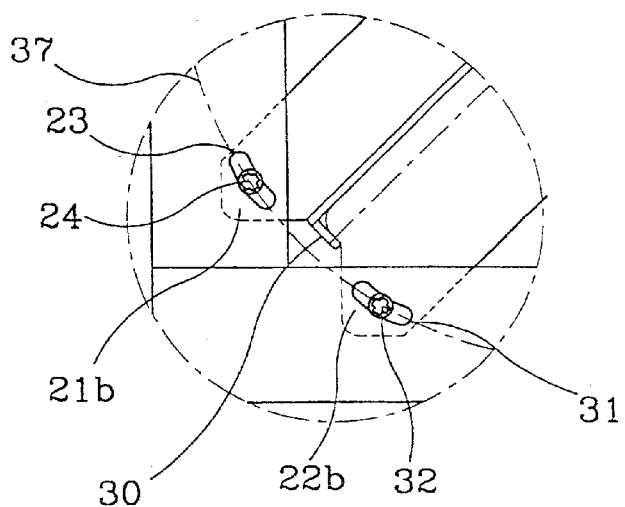
FIG. 6 is an enlarged perspective view enlarging the "A" portion of FIG. 4.

As can be seen in FIG. 6, the lower end portions 21b of the lower tilt surface (25 of FIG. 4) of the upper frame 21 is curved at a predetermined angle so that lower curved portions 30 with a predetermined resilience are formed. The lower curved portions 3 0 are formed by bending the lower end portion 21b of the lower tilt surface (25 of FIG. 4) of the upper frame(21 of FIG. 4) in a downward direction. Therefore, the lower curved portions 30 abut the lower end surface of the half mirror 17 in a resilient manner, preventing the half mirror 17 from slipping downward.

Figure 7:
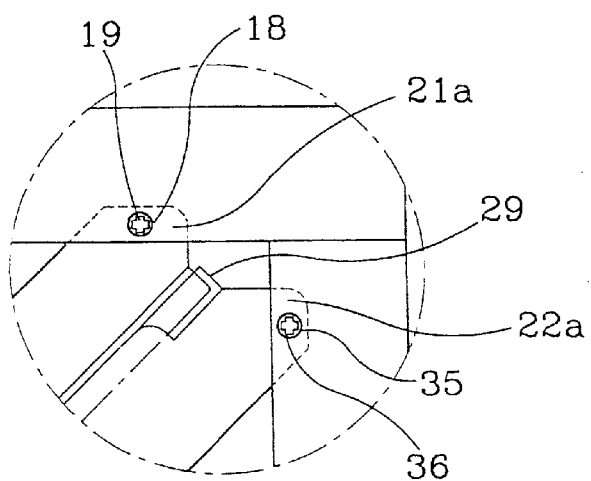
FIG. 7 is an enlarged perspective view enlarging the "B" portion of FIG. 4.

As can be seen in FIG. 7, the upper end portion 22a of the upper tilt surface 27 of the lower frame 22 is bent at a predetermined angle to form upper curved portions 29 having resilience. The upper curved portions 29 are formed by bending the upper end portions 22a of a upper tilt surface 27 of the lower frame 22 upwards. Therefore, the upper cured portions 29 abut the upper end surfaces of the half mirror 17 resiliently, preventing the half mirror 17 from moving upward.

Figure 8:
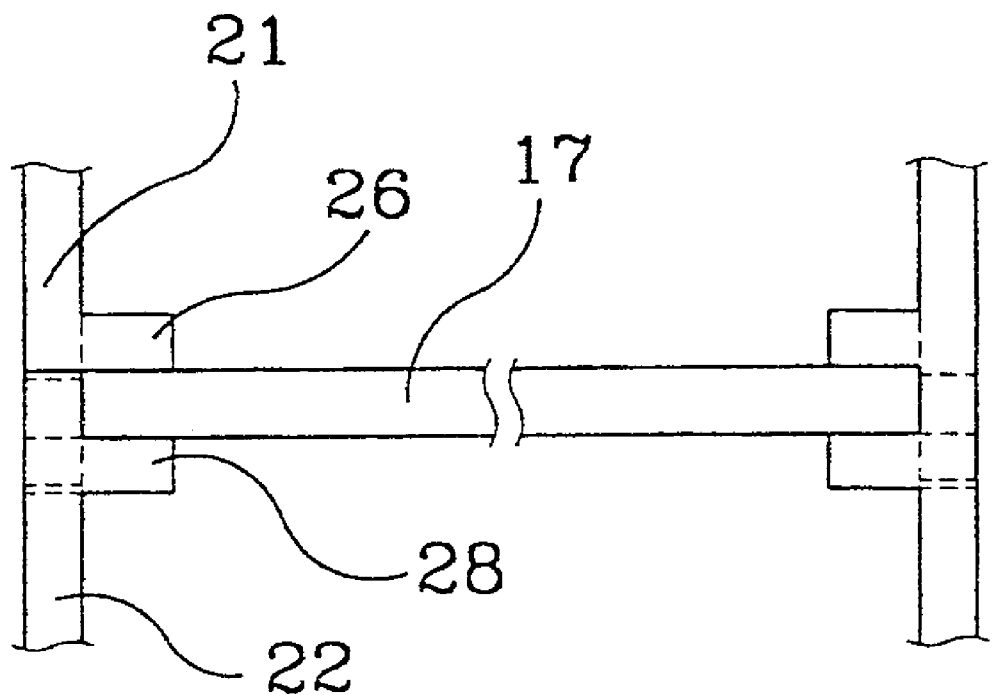
FIG. 8 is a sectional view taken along the line C—C of FIG. 4.

In conclusion, as can be seen in FIG. 8, since the half mirror 17 is resiliently secured within the space formed by the pressing portions 26 and supporting portions 28 which have resilience of the upper and lower securing frame 21 and 22, clattering or vibrations which can be caused by external forces are prevented.

Figure 4:
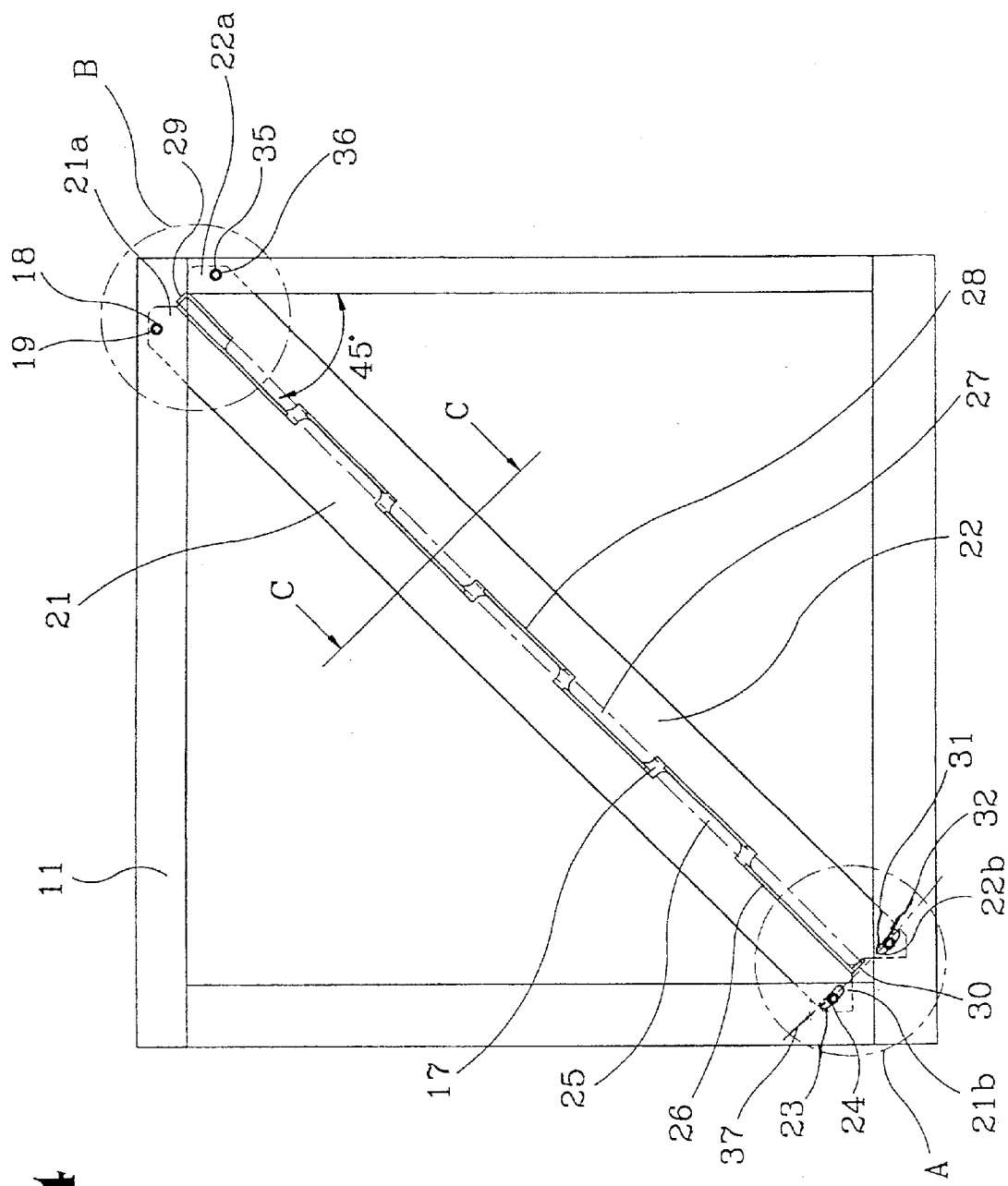
FIG. 4 is a side sectional view of the securing frame according to the present invention.

Referring to FIG. 3 and FIG. 4, when the half mirror 17 is tilted to more than 45 degrees due to external forces such as vibrations, the second control screw 32 of the lower frame 22 is released from the second hole 31. Then, the lower frame 22 is rotated in a counterclockwise direction for a predetermined angle, correcting the angle to forty-five degrees. After the correction, the second control screw 32 again engages the second hole 31, securing the lower frame 22 to the case 11.

After the correction of the lower frame 22, the upper frame 21 is corrected. That is, the first control screw 24 of the upper frame 21 is released from the first hole 23. Then, the upper frame 21 is rotated in counterclockwise direction for a predetermined angle, correcting the angle to 45 degrees . After the correction, the first control screw 24 again engages the first hole 23, securing the upper frame 21 to the case 11. Therefore, the half mirror 17 maintains 45 degrees.

After correcting the upper frame 21, the lower frame 22 is again corrected. That is, the second control screw 32 of the lower frame 22 is released from the second hole 31. And then, by rotating the lower frame 22 in clockwise direction for a predetermined angle, the angle is corrected to 45 degrees. After the correction, the second control screw 32 again engages the second hole 31, securing the lower frame 22 to the case 11. As can be seen, by releasing the engaging the first and the second control screws, the half mirror can maintain 45 degrees.

Since the securing frame of the 3D monitor according to the present invention facilitates the correction of the angle of the half mirror, clearer 3D images can be attained.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A securing structure of a half mirror of a 3D monitor, comprising:
    a box shaped case wherein said half mirror is installed in a first diagonal direction;
    a pair of upper frames installed at respective sides of said case, each one of said pair of upper frames being oriented in said first diagonal direction, each one of said pair of upper frames having protruding portions at a lower tilt surface thereof, said protruding portions being curved inward to form pressing portions exerting force to an upper surface of said half mirror resiliently, each upper end portion of said pair of upper frames being fixed to an upper portion of said case in a rotatable manner, each lower end of said pair of upper frames having a first hole, a first control screw penetrates each first hole and engages a lower portion of said case so that each one of said pair of upper frames rotates clockwise and counterclockwise for a predetermined angle;
    a pair of first curved portions curved in a downward direction perpendicularly to support a lower edge of said half mirror,
    a pair of lower frames, each one of said pair of lower frames being installed at respective sides of said case, each of said pair of lower frames being oriented in said first diagonal direction, each one of said pair of lower frames being installed onto respective ones of said pair of upper frames, each one of said pair of lower frames having protruding portions on an upper tilt surface, the protruding portions being curved inward to form supporting portions supporting a lower surface of said half mirror resiliently, each upper end portion of said pair of lower frames being fixed to said upper portion of said case, each lower end portion of said pair of lower frames having a second hole, a second control screw penetrates each second hole and engages said lower portion of said case so that each one of said pair of lower frames rotates clockwise and counterclockwise for a predetermined angle; and
    each of said upper end portions of said pair of lower frames being curved in an upward direction forming second curved portions supporting an upper edge of said half mirror, and said half mirror being secured resiliently between said pressing portions and said supporting portions.

2. The securing structure of claim 1, each one of said first holes having an identical radius of curvature to that of a rotational trajectory of respective ones of said pair of upper frames, each one of said second holes having an identical radius of curvature to that of a rotational trajectory of respective ones of said pair of lower frames, wherein, in order to control an angle of the securing frames, each one of said first control screws and each one of said second control screws are released and then each one of said pair of upper frames and each one of said pair of lower frames are rotated in clockwise and counterclockwise directions and then each one of said first control screws and each one of said second control screws are secured.

3. A securing structure of a half mirror of a 3D monitor, comprising:
    a box shaped case wherein said half mirror is installed in a first diagonal direction;
    a pair of upper frames installed at respective sides of said case in said first diagonal direction, each upper end portion of said pair of upper frames being fixed to an upper portion of said case in an adjustable manner, each lower end portion of said pair of upper frames having a first hole, a first control screw penetrates each first hole and engages a lower portion of said case so that each one of said pair of upper frames moves relative to said case;
    a pair of first curved portions curved in a downward direction perpendicularly to support a lower edge of said half mirror;
    a pair of lower frames, each one of said pair of lower frames being installed at respective sides of said case, each one of said pair of lower frames being oriented in said first diagonal direction, each one of said pair of lower frames being installed onto respective ones of said pair of upper frames, each upper end portion of each one of said pair of lower frames being fixed to said upper portion of said case, each lower end portion of said pair of lower frames having a second hole, a second control screw penetrates each second hole and engages said lower portion of said case so that each one of said pair of lower frames moves relative to said case; and
    each upper end portion of each one of said pair of lower frames being curved in an upward direction forming second curved portions supporting an upper edge of said half mirror, and said half mirror being secured resiliently between pressing portions of said pair of upper frames and supporting portions of said pair of lower frames.

4. The securing structure of claim 3, each one of said first holes having an identical radius of curvature to that of a rotational trajectory of respective ones of said pair of upper frames, each one of said second holes having an identical radius of curvature to that of a rotational trajectory of respective ones of said pair of lower frames, wherein, in order to control an angle of the securing frames, each one of said first control screws and each one of said second control screws are released and then each one of said pair of upper frames and each one of said pair of lower frames are rotated in clockwise and counterclockwise directions and then each one of said first control screws and each one of said second control screws are secured.

5. A method for adjusting a half mirror disposed in a case, said half mirror having a 45 degree angle with a bottom of said case, said method comprising the steps of:

releasing a pair of second control screws from a pair of lower frames, each one of said pair of lower frames having a second hole having a second control screw therein;

rotating each one of said pair of lower frames relative to said case to correct said angle of said half mirror;

tightening each second control screw on each one of said pair of lower frames, securing said pair of lower frames to said case;

releasing a pair of first control screws from a pair of upper frames, each one of said pair of upper frames having a first hole having a first control screw;

rotating each one of said pair of upper frames relative to said case to correct said angle of said half mirror; and tightening each first control screw on each one of said pair of upper frames, securing said pair of upper frames to said case.

6. The method of claim 5, further comprising the steps of:

releasing said pair of second control screws from said pair of lower frames;

rotating each one of said pair of lower frames relative to said case to correct said angle of said half mirror; and tightening each second control screw on each one of said pair of lower frames, securing said pair of lower frames to said case.

* * * * *